Oct. 14, 1969 H. N. CANTRELL ET AL 3,473,159
DATA PROCESSING SYSTEM INCLUDING MEANS FOR PROTECTING
PREDETERMINED AREAS OF MEMORY
Filed July 7, 1966

INVENTORS.
HARRY N. CANTRELL
JOHN F. COULEUR
BY
William C. Cahill
Arnold E. Renner
Ronald N. O'Keefe
ATTORNEYS.

United States Patent Office 3,473,159

Patented Oct. 14, 1969

3,473,159

DATA PROCESSING SYSTEM INCLUDING MEANS FOR PROTECTING PREDETERMINED AREAS OF MEMORY

Harry N. Cantrell and John F. Couleur, Phoenix, Ariz., assignors to General Electric Company, a corporation of New York Filed July 7, 1966, Ser. No. 563,519

Int. Cl. G06f *1/00*

U.S. Cl. 340—172.5 7 Claims

ABSTRACT OF THE DISCLOSURE

A data processing system including an addressable memory having predetermined areas to be protected against unauthorized access. A memory controller is connected to the memory device and acts as the communications center for receiving data and instructions from other subsystems. The memory controller includes a file protect register including a plurality of flip-flops, each of which produces an output which may be utilized to protect a block of memory. The bit configuration thus provided by the register represents a pattern of blocks or areas within the memory to be protected. The memory controller includes an address decode and matrix for comparison of addresses subsequently provided thereto by connected subsystems for determining whether the addresses fall within the protected blocks of memory.

The present invention pertains to data processing systems, and more specifically, to those systems including a memory device having discrete addressable locations and certain areas to which access is to be limited.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priorty when more than one input/output device is attempting to communicate with the data processing system. Since input/output devices are usually electromechanical in nature and necessarily having much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/ouput devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, and input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

It is frequently desirable to limit the access of the various subsystems to specific portions of the memory device. For example, in multiprogramming environments, an executive program must be stored and remain inviolate and must not be disturbed inadvertently or otherwise by the operation of a slave program. Further, the particular location of the protected memory area may be changed from time to time to meet the demands of various system configurations, programming convenience, program size, etc. To provide the protection to predetermined areas of memory, the present system incorporates a storage register in the memory controller that may be loaded, under executive program control, with a particular bit configuration corresponding to areas in memory to be protected. When addresses are received by the memory controller from subsystems the addresses are decoded/encoded and applied to a comparison network in the memory controller for comparison with the bit configuration in the memory controller storage register. A coincidence in the comparison unit results in the generation of a signal indicating an illegal action has occurred and also results in the generation of a code indicating that a protected area of memory has been accessed by a subsystem. The attempted access to the protected area is blocked and the contents of memory are not changed.

It is therefore an object of the present invention to provide a means for protecting predetermined areas of memory from unauthorized access.

It is also an object of the present invention to provide a data processing system having a memory controller including a storage means for storing a bit configuration corresponding to areas to be protected in memory.

It is a further object of the present invention to provide a data processing system including a memory controller wherein bit configurations corresponding to predetermined areas in memory may be stored and wherein said bit configurations may be changed thereby altering the specific areas to be protected.

It is still another object of the present invention to provide a data processing system having a plurality of subsystems each capable of accessing memory through a memory controller and wherein the addresses generated by each of the subsystems are compared with a bit configuration stored in the memory controller to prevent access to predetermined protected areas in memory.

These and other objects of the present invention will become apparent to those skilled in the art as the description proceeds.

Certain portions of the apparatus herein desclosed are not of our invention, but are the inventions of:

Robert Cohen, William A. Shelly, and Samuel M. Vidulich, as defined by the claims of their application, Serial No. 567,221, filed July 22, 1966;

David L. Bahrs and John F. Couleur, as defined by the claims of their application, Serial No. 567,222, filed July 22, 1966;

John F. Couleur and Richard L. Ruth, as defined by the claims of their application, Serial No. 569,750, filed Aug. 2, 1966;

John F. Couleur, Philip F. Gudenschwager, Richard L. Ruth, William A. Shelly, and Leonard G. Trubisky, as defined by the claims of their application, Serial No. 577,376, filed Sept. 6, 1966;

John F. Couleur, as defined by the claims of his application, Serial No. 581,467, filed Sept. 23, 1966; and John F. Couleur, Richard L. Ruth, and William A. Shelly, as defined by the claims of their application, Serial No. 584,801, filed Oct. 6, 1966; all such applications being assigned to the assignee of the present application.

DESCRIPTION OF FIGURES

The present invention may more readily be described by reference to the accompanying drawings in which.

Figure 1:
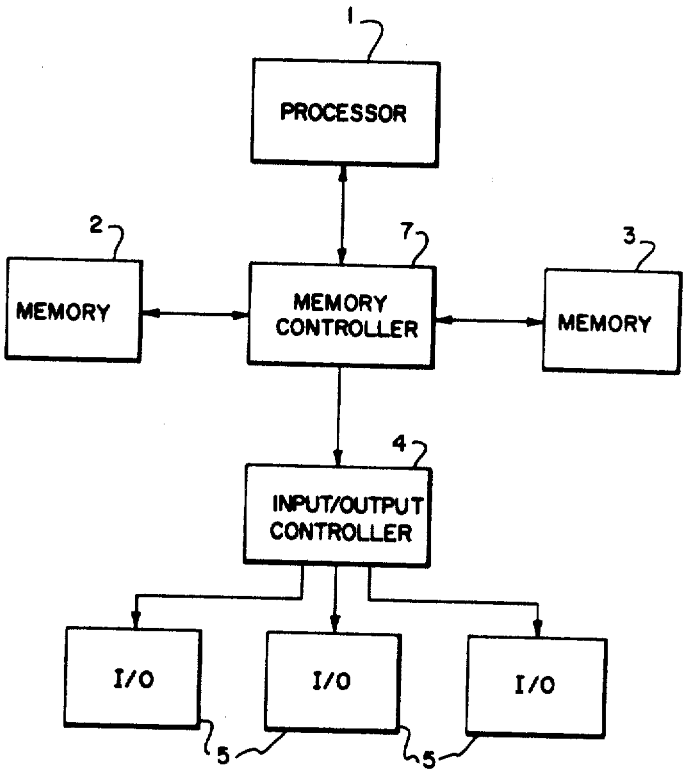
FIGURE 1 is a block diagram of a data processing system in a single memory controller configuration.

For a complete description of the system of FIGURE 1 and of my invention, reference is made to United States Patent No. 3,413,613 issued to David L. Bahrs, John F. Couleur, Richard L. Ruth, and William A. Shelly, on Nov. 26, 1968, and assigned to the assignee of the present invention. More particularly, attention is directed to FIGURES 2–120 and to the specification beginning at column 4, line 32 and ending at column 121, line 42 inclusive of United States Patent No. 3,413,613 which are incorporated herein by reference and made a part hereof.

What is claimed is:

1. In a data processing system, the combination comprising: a memory device for storing data at discrete addresses, said memory device having storage areas to be protected; a plurality of subsystems each requiring access to said memory device and including means for generating addresses and for manipulating data; a memory controller connected to said memory device and to all of said subsystems for receiving addresses and data; said memory controller including a storage means for receiving and storing data in the form of bit configurations corresponding to areas to be protected in said memory device, each bit of said bit configuration corresponding to a different area to be protected, said memory controller also including comparison means responsive to the coincidence of a bit configuration in said storage means with an address received by said memory controller from a subsystem for generating a signal.

2. In a data processing system, the combination comprising: a memory device for storing data at discrete addresses, said memory device having storage areas to be protected; a plurality of subsystems each requiring access to said memory device and including means for generating addresses and for manipulating data; a memory controller connected to said memory device and to all of said subsystems for receiving addresses and data; said memory controller including a register for receiving and storing data in the form of bit configurations corresponding to areas to be protected in said memory device, each bit of said bit configuration corresponding to a different area to be protected, said memory controller also including comparison means responsive to the coincidence of a bit configuration in said register with an address received by said memory controller from a subsystem for generating a signal.

3. In a data processing system, the combination comprising: a memory device for storing data at discrete addresses, said memory device having storage areas to be protected; a plurality of subsystems each requiring access to said memory device and including means for generating addresses and memory controller commands and for manipulating data; a memory controller connected to said memory device and to all of said subsystems for receiving addresses, memory controller commands, and data; said memory controller including a storage means for receiving and storing data in the form of bit configurations corresponding to areas to be protected in said memory device, each bit of said bit configuration corresponding to a different area to be protected, said memory controller also including comparison means responsive to the coincidence of a bit configuration in said storage means with an address received by said memory controller from a subsystem for generating a signal; said memory controller responsive to a predetermined memory controller command for storing in said storage means a bit configuration supplied as data from a subsystem providing said predetermined memory controller command.

4. In a data processing system, the combination comprising: a memory device for storing data at discrete addresses, said memory device having storage areas to be protected; a plurality of subsystems each requiring access to said memory device and including means for generating addresses and memory controller commands and for manipulating data; a memory controller connected to said memory device and to all of said subsystems for receiving addresses, memory controller commands, and data; said memory controller including a register for receiving and storing data in the form of bit configurations corresponding to areas to be protected in said memory device, each bit of said bit configuration corresponding to a different area to be protected, said memory controller also including comparison means responsive to the coincidence of a bit configuration in said register with an address received by said memory controller from a subsystem for generating a signal; said memory controller responsive to a predetermined memory controller command for storing in said register a bit configuration supplied as data from a subsystem providing said predetermined memory controller command.

5. In a data processing system, the combination comprising: a memory device for storing data at discrete addresses, said memory device having storage areas to be protected; a plurality of subsystems each requiring access to said memory device and including means for generating addresses and for manipulating data; a memory controller connected to said memory device and to all of said subsystems for receiving addresses and data; said memory controller including a storage means for receiving and storing data in the form of bit configurations corresponding to areas to be protected in said memory device, each bit of said bit configuration corresponding to a different area to be protected, said memory controller also including comparison means responsive to the coincidence of a bit configuration in said storage means with an address received by said memory controller from a subsystem for generating a signal; means responsive to said signal for generating a code indicating an attempted access to a protected area of memory.

6. In a data processing system, the combination comprising: a memory device for storing data at discrete addresses, said memory device having storage areas to be protected; a plurality of subsystems each requiring access to said memory device and including means for generating addresses and memory controller commands and for manipulating data; a memory controller connected to said memory device and to all of said subsystems for receiving addresses, memory controller commands, and data; said memory controller including a storage means for receiving and storing data in the form of bit configurations corresponding to areas to be protected in said memory device, each bit of said bit configuration corresponding to a different area to be protected, said memory controller also including comparison means responsive to the coincidence of a bit configuration in said storage means with an address received by said memory controller from a subsystem for generating a signal; said memory controller responsive to a predetermined memory controller command for storing in said storage means a bit configuration supplied as data from a subsystem providing said predetermined memory controller command; means responsive to said signal for generating a code indicating an attempted access to a protected area of memory.

7. In a data processing system, the combination comprising: a memory device for storing data at discrete addresses, said memory device having storage areas to be protected; a plurality of subsystems each requiring access to said memory device and including means for generating addresses and memory controller commands and for manipulating data; a memory controller connected to said memory device and to all of said subsystems for receiving addresses, memory controller commands, and data; said memory controller including a register for receiving and storing data in the form of bit configurations corresponding to areas to be protected in said memory device, each bit of said bit configuration corresponding to a different area to be protected, said memory controller also including comparison means responsive to the coincidence of a bit configuration in said register with an address received by said memory controller from a subsystem for generating a signal; said memory controller responsive to a predetermined memory controller command for storing in said register a bit configuration supplied as data from a subsystem providing said predetermined memory controller command; means responsive to said signal for generating a code indicating an attempted access to a protected area of memory.

References Cited

UNITED STATES PATENTS

| | | | |
|---|---|---|---|
| 3,264,615 | 8/1966 | Case et al. -------- | 340—172.5 |
| 3,245,045 | 4/1966 | Randlev ---------- | 340—172.5 |
| 3,263,218 | 7/1966 | Anderson --------- | 340—172.5 |
| 3,302,182 | 1/1967 | Lynch et al. ------ | 340—172.5 |
| 3,319,226 | 5/1967 | Mott et al. -------- | 340—172.5 |
| 3,328,765 | 6/1967 | Amdahl et al. ------ | 340—172.5 |
| 3,328,768 | 6/1967 | Amdahl et al. ------ | 340—172.5 |

PAUL J. HENON, Primary Examiner